United States Patent [19]
Pascal et al.

[11] Patent Number: 5,078,369
[45] Date of Patent: Jan. 7, 1992

[54] ELASTICALLY YIELDABLE CONNECTION WITH A HYDRAULIC STIFFENING

[75] Inventors: Robic Pascal, Guignen; Le F. Marcel, Giron, both of France

[73] Assignees: Automobiles Peugeot, Paris; Automobiles Citroen, Neuilly/Seine, both of France

[21] Appl. No.: 320,511

[22] Filed: Mar. 8, 1989

[30] Foreign Application Priority Data

Mar. 8, 1988 [FR] France .................. 88 02955

[51] Int. Cl.$^5$ ................... F16M 5/00; F16F 9/10
[52] U.S. Cl. .................. 267/140.1 A; 180/312; 248/562; 248/636; 267/219
[58] Field of Search ............ 267/140.1 R, 140.1 A, 267/140.1 C, 141.2, 219, 140.5, 141, 153; 180/300, 312, 902; 280/710; 248/562, 565, 636, 638

[56] References Cited

U.S. PATENT DOCUMENTS

| | | |
|---|---|---|
| 2,226,388 | 12/1940 | Richter . |
| 2,387,066 | 10/1945 | Harding . |
| 2,421,585 | 6/1947 | Thiry ............... 267/140.1 |
| 2,540,130 | 2/1951 | Lee . |
| 2,562,195 | 7/1951 | Lee . |
| 2,926,881 | 3/1960 | Painter . |
| 3,013,920 | 12/1961 | Harris et al. . |
| 3,154,273 | 10/1964 | Paulsen . |
| 3,202,388 | 8/1965 | Goodwin . |
| 3,586,403 | 6/1971 | Cooley . |
| 3,642,268 | 2/1972 | Hipsher . |
| 3,651,902 | 3/1972 | Peddinghaus . |
| 3,698,703 | 10/1972 | Hipsher . |
| 3,731,771 | 5/1973 | Borgo . |
| 3,795,390 | 3/1974 | Kendall et al. . |
| 3,920,231 | 11/1975 | Harrison et al. ............... 267/219 X |
| 3,958,654 | 5/1976 | LeSalver et al. . |
| 3,970,162 | 7/1976 | LeSalver et al. . |
| 4,054,277 | 10/1977 | Sirven . |
| 4,159,091 | 6/1979 | LeSalver et al. . |
| 4,191,398 | 3/1980 | Willetts . |
| 4,211,429 | 7/1980 | Howard . |
| 4,215,842 | 8/1980 | Brenner et al. . |

(List continued on next page.)

FOREIGN PATENT DOCUMENTS

| | | |
|---|---|---|
| 0005730 | 11/1979 | European Pat. Off. . |
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |
| 0054776 | 6/1982 | European Pat. Off. . |
| 0072262 | 2/1983 | European Pat. Off. . |
| 0091246 | 10/1983 | European Pat. Off. . |
| 0139261 | 5/1985 | European Pat. Off. . |
| 0147242 | 7/1985 | European Pat. Off. . |
| 0148387 | 7/1985 | European Pat. Off. . |
| 0149080 | 7/1985 | European Pat. Off. . |
| 0154268 | 9/1985 | European Pat. Off. . |
| 0163817 | 12/1985 | European Pat. Off. . |
| 0209883 | 1/1987 | European Pat. Off. . |

(List continued on next page.)

OTHER PUBLICATIONS

Report "Theory of the Hydraulically Damped Motor Mount With a Long Nozzle".
Report comparing Motor Mounts (with English translation).
Darwing dated Oct. 5, 1979 with attachments.
Freudenberg drawing 10780 dated Nov. 5, 1979.
"The Use of Engine Mounts With Integrated Hydraulic Damping in Passenger Cars", presented by Le Salver, 1983.

*Primary Examiner*—George E. A. Halvosa
*Attorney, Agent, or Firm*—Burns, Doane, Swecker & Mathis

[57] ABSTRACT

An elastically yieldable connection of the type comprising a block composed of elastomer material to which are connected two armatures which are relatively movable. The connection comprises at least one deformable sealed chamber filled with a liquid and arranged between two portions of each of the two armatures so as to increase the elastic stiffness of the connection in a direction (T) of relative displacement of the armatures substantially perpendicular to a plane parallel to which extend the two armature portions, and at least in the direction corresponding to an approach between these portions. Application in particular in the mounting of a set of wheels of a motor vehicle.

14 Claims, 3 Drawing Sheets

U.S. PATENT DOCUMENTS

| | | |
|---|---|---|
| 4,262,886 | 4/1981 | LeSalver et al. . |
| 4,274,655 | 6/1981 | Lederman . |
| 4,277,056 | 7/1981 | Ticks . |
| 4,319,768 | 3/1982 | Youngdale . |
| 4,336,968 | 6/1982 | Hibner . |
| 4,389,045 | 6/1983 | Taylor . |
| 4,416,445 | 11/1983 | Coad ................................ 248/562 X |
| 4,418,895 | 12/1983 | Bertin et al. ..................... 248/562 X |
| 4,422,779 | 12/1983 | Hamaekers et al. . |
| 4,424,960 | 1/1984 | Dan et al. ........................ 248/562 X |
| 4,469,316 | 4/1984 | van den Boom et al. . |
| 4,510,818 | 4/1985 | Inui . |
| 4,519,211 | 5/1985 | Sedille et al. . |
| 4,568,069 | 2/1986 | Poupard . |
| 4,573,656 | 3/1986 | Yoshida et al. . |
| 4,588,173 | 5/1986 | Gold et al. . |
| 4,603,844 | 8/1986 | Chen . |
| 4,630,803 | 12/1986 | Werner et al. . |
| 4,657,232 | 4/1987 | West . |
| 4,673,156 | 6/1987 | Tabata . |
| 4,679,777 | 7/1987 | Gold et al. . |
| 4,679,778 | 7/1987 | Tabata et al. . |
| 4,688,662 | 8/1987 | Correll . |
| 4,702,346 | 11/1987 | Uno et al. . |
| 4,705,410 | 12/1987 | von Broock . |
| 4,720,086 | 1/1988 | LeSalver et al. . |
| 4,733,854 | 3/1988 | Miyamoto . |
| 4,738,434 | 4/1988 | Marjoram et al. . |
| 4,756,514 | 6/1988 | Kanda . |
| 4,767,106 | 8/1988 | Le Fol . |
| 4,767,107 | 8/1988 | Le Fol . |
| 4,768,760 | 9/1988 | Le Fol . |
| 4,834,416 | 3/1987 | Shimoe . |

FOREIGN PATENT DOCUMENTS

| | | |
|---|---|---|
| 0213324 | 3/1987 | European Pat. Off. . |
| 0220465 | 5/1987 | European Pat. Off. . |
| 0231898 | 8/1987 | European Pat. Off. . |
| 0242254 | 12/1987 | European Pat. Off. . |
| 278798 | 8/1988 | European Pat. Off. ............ 267/219 |
| 547194 | 2/1934 | Fed. Rep. of Germany . |
| 728501 | 11/1942 | Fed. Rep. of Germany . |
| 1124832 | 3/1962 | Fed. Rep. of Germany . |
| 1625389 | 7/1970 | Fed. Rep. of Germany . |
| 7407909 | 5/1977 | Fed. Rep. of Germany . |
| 2948408 | 6/1981 | Fed. Rep. of Germany . |
| 0071698 | 2/1983 | Fed. Rep. of Germany . |
| 3245653 | 6/1984 | Fed. Rep. of Germany . |
| 3414547 | 10/1985 | Fed. Rep. of Germany . |
| 3610611 | 10/1987 | Fed. Rep. of Germany . |
| 3722079A | 1/1988 | Fed. Rep. of Germany . |
| 926846 | 4/1947 | France . |
| 1189778 | 3/1959 | France . |
| 1242350 | 8/1960 | France . |
| 1336186 | 7/1963 | France . |
| 1380784 | 10/1964 | France . |
| 1540380 | 8/1968 | France . |
| 1549300 | 11/1968 | France . |
| 2031658 | 11/1970 | France . |
| 2332151 | 6/1977 | France . |
| 2349066 | 11/1977 | France . |
| 2394715 | 1/1979 | France . |
| 2435632 | 4/1980 | France . |
| 2547378 | 6/1984 | France . |
| 2555272 | 11/1984 | France . |
| 2555688 | 5/1985 | France . |
| 56-63141 | 5/1981 | Japan . |
| 56-143830 | 11/1981 | Japan . |
| 59-11731 | 7/1982 | Japan . |
| 58-88245 | 5/1983 | Japan ................................ 248/638 |
| 59-93533 | 5/1984 | Japan ................................ 248/638 |
| 61-290250 | 12/1986 | Japan ................................ 248/562 |
| 63-278798 | 8/1988 | Japan ................................ 267/219 |
| 63-3088342 | 9/1988 | Japan ................................ 267/153 |

ELASTICALLY YIELDABLE CONNECTION WITH A HYDRAULIC STIFFENING

The present invention relates to an elastically yieldable connection of the type comprising a block of an elastomer material to which are connected two armatures which are movable relative to each other.

Such a type of elastically yieldable connection is in particular employed for mounting a set of rolling wheels, such as the rear axle, of a motor vehicle relative to the body of the latter.

In this type of mounting, it is usual to employ two elastically yieldable connections located symmetrically on each side of the longitudinal axis of the motor vehicle. The elastically yieldable connection must not have the same elastic stiffness in all directions. In order to obtain a good filtering of the vibrations transmitted by the set of wheels to the body of the vehicle, the connection must have the lowest possible stiffness in the longitudinal direction. The stiffness in the vertical direction must be compatible with the load of the body of the vehicle supported by the connection.

On the other hand, the highest possible stiffness is required in the transverse direction to ensure the transverse guiding of the set of wheels relative to the body of the vehicle.

An object of the present invention is to provide an elastically yieldable connection which has a ratio of the transverse stiffness to the vertical stiffness which is very high and in particular higher than 20.

According to the invention, this is achieved by means of an elastically yieldable connection comprising at least one deformable sealed chamber filled with a liquid and arranged between two portions of each of the armatures so as to increase the elastic stiffness of the connection in a direction of relative displacement of the armatures substantially perpendicular to a plane to which said two portions of the armatures extend in a parallel manner.

Owing to this feature, an elastically yieldable connection arranged relative to the body of the vehicle in such a manner that said direction of relative displacement is the transverse direction of the vehicle permits very greatly increasing the elastic stiffness of the connection in said direction owing to the incompressibility of the liquid contained in the sealed chamber.

According to other features of the invention:

the chamber is defined by a tubular lateral wall composed of an elastomer material each of the opposed annular end surfaces of which is connected in a sealed manner to the confronting armature portion;

the tubular wall is a substantially cylindrical wall whose generatrix is parallel to said direction of displacement and whose director curve may be a rectangle;

the chamber is also defined by an end wall which is in one piece with the lateral wall and bonded or vulcanized to the confronting armature portion.

These features enable the deformable sealed chamber to be very simply produced, in particular by moulding its walls of elastomer material on the metal armature portions of the connection, this moulding operation being for example carried out simultaneously with the moulding operation of the block of elastomer material to which the two armatures are connected.

In order to permit the assembly of the connection, during which operation the sealed chamber must be completely filled, one of the annular end surfaces of the lateral wall is bonded or vulcanized to an intermediate connection frame whose contour substantially corresponds to the contour of said annular end surface and which includes means for obtaining a sealed connection with the confronting armature portion.

According to other features of the invention:

the sealed connecting means are formed by a peripheral edge portion of the intermediate frame set or formed over around the armature portion;

the sealed connecting means further comprise an inner sealing bead which is in one piece with the lateral wall in the vicinity of its annular end surface and which cooperates with the inner edge portion of the intermediate frame and the confronting surface of the armature portion, and each connection may be characterized in that the armatures are two opposed and parallel planar armatures which are axially separated by a block of elastomer material each of the opposed surfaces of which is bonded or vulcanized to the confronting armature, and the armature portions are bent at 90 degrees toward the opposed armature.

In order to ensure that the sealed chamber has the best possible resistance to increase in pressure and therefore that the stiffness of the connection be maximum in the concerned direction of displacement, the lateral wall has, in section in a plane parallel to said direction of displacement, an arch-shaped profile whose convexity faces towards the interior of the chamber.

The transverse guiding of a set of wheels of a motor vehicle requires arranging two connections symmetrically and in an opposed manner in accordance with the teachings of the present invention.

However, in order to still further improve the transverse behavior of the set of wheels, each connection may include a second deformable sealed chamber filled with a liquid and arranged between two other portions of each of the armatures which extend in a direction parallel to a plane perpendicular to said direction of relative displacement of the armatures.

According to a first modification, the two parallel portions of one of the two armatures extend between the two parallel portions of the other of the two armatures so as to increase the axial stiffness of the connection in said direction of relative displacement in both directions of displacement.

According to another modification, the two parallel portions of one of the two armatures may be arranged in an alternating manner relative to the two parallel portions of the other of the two armatures so as to increase the axial stiffness of the connection having two chambers according to said direction of relative displacement in one direction of displacement.

Further features and advantages of the invention will be apparent from the following detailed description an understanding of which will be facilitated by reference to the accompanying drawings in which.

Figure 1:
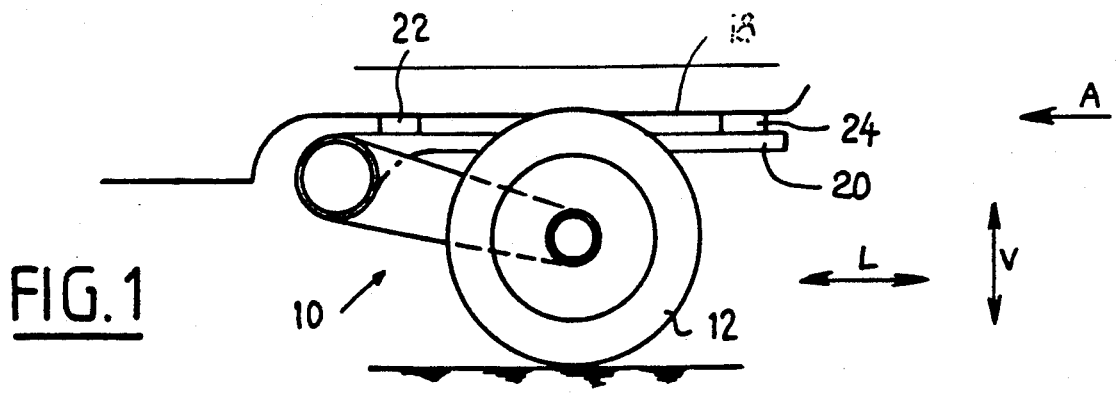
FIG. 1 is a diagrammatic side elevational view of the general principle of the mounting of a rear set of wheels relative to the body of a motor vehicle.
Figure 2:
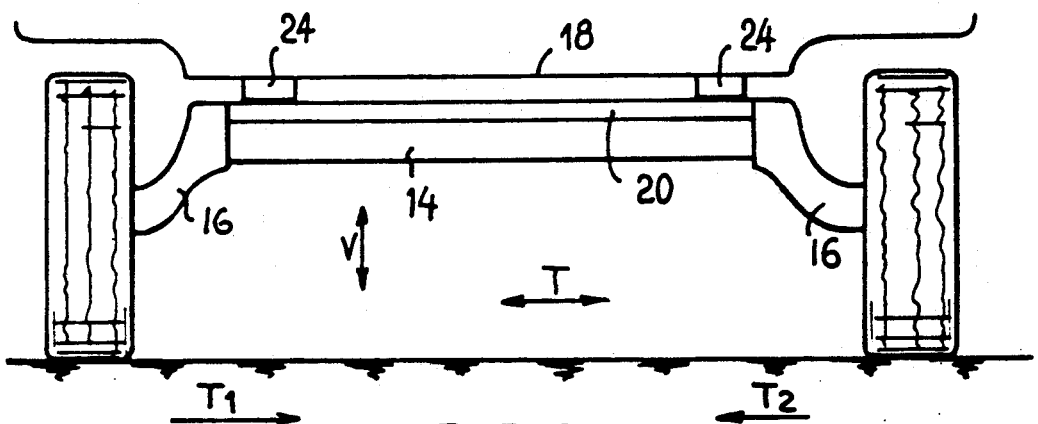
FIG. 2 is a view in the direction of arrow A of FIG. 1.

FIGS. 1 and 2 show a rear set of wheels 10 of a motor vehicle comprising in particular wheels 12 connected to a central girder 14 by lateral arms 16. The girder 14 is connected to the body 18 by a cross-member 20 of a rear set of wheels with interposition of two elastically yieldable articulations 22 and two elastically yieldable connections 24.

Each elastically yieldable connection 24 is subjected to forces in three main directions, i.e. in the vertical direction V, the longitudinal direction L and the transverse direction T.

The forces applied in the transverse direction T correspond to a relative displacement of the set of wheels 10 relative to the body 18 of the vehicle in direction substantially parallel to the direction T, this displacement occurring for example in two opposite directions T1 and T2.

Figure 5:
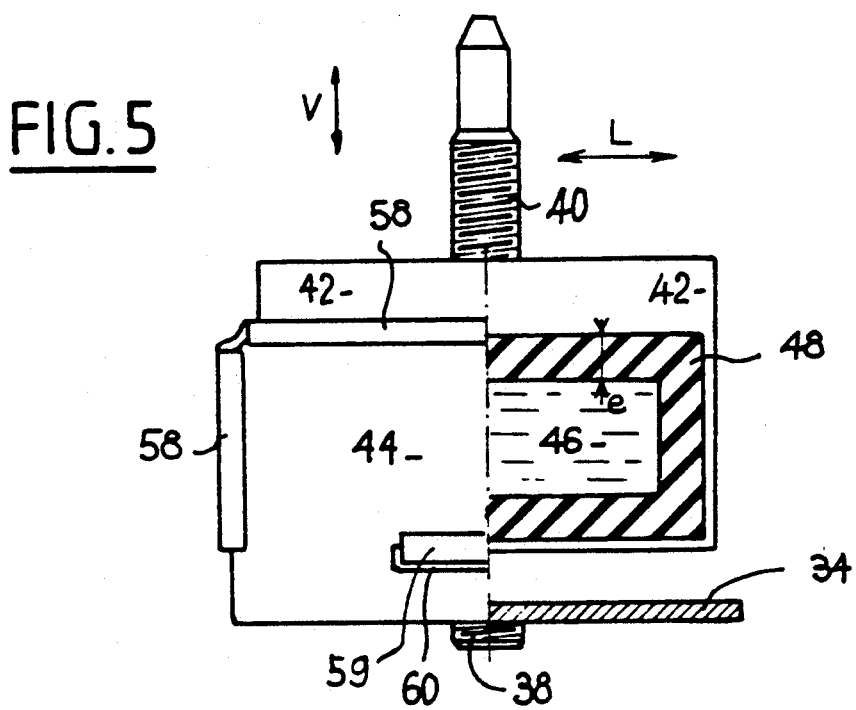
FIG. 5 is a semi-side elevational view of the right side and a semi-sectional view taken on line 5—5 of FIG. 3.
Figure 3:
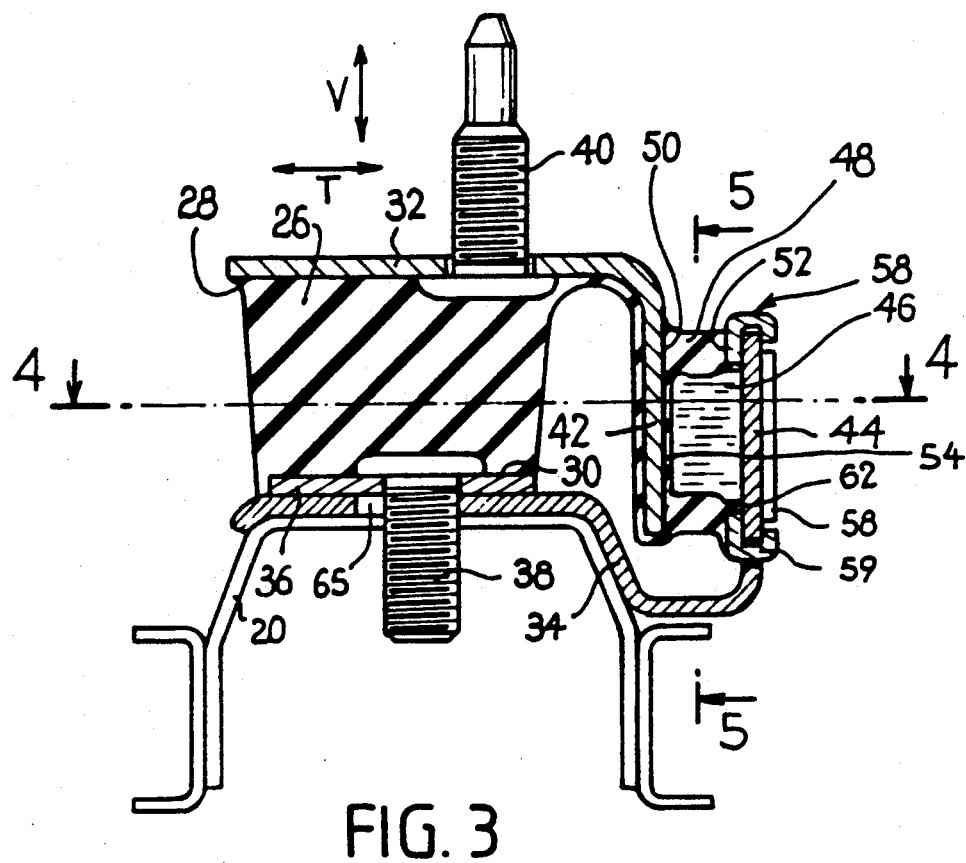
FIG. 3 is a sectional view taken on line 3—3 of FIG. 4, of an elastically yieldable connection arranged in accordance with the teaching of the invention.
Figure 4:
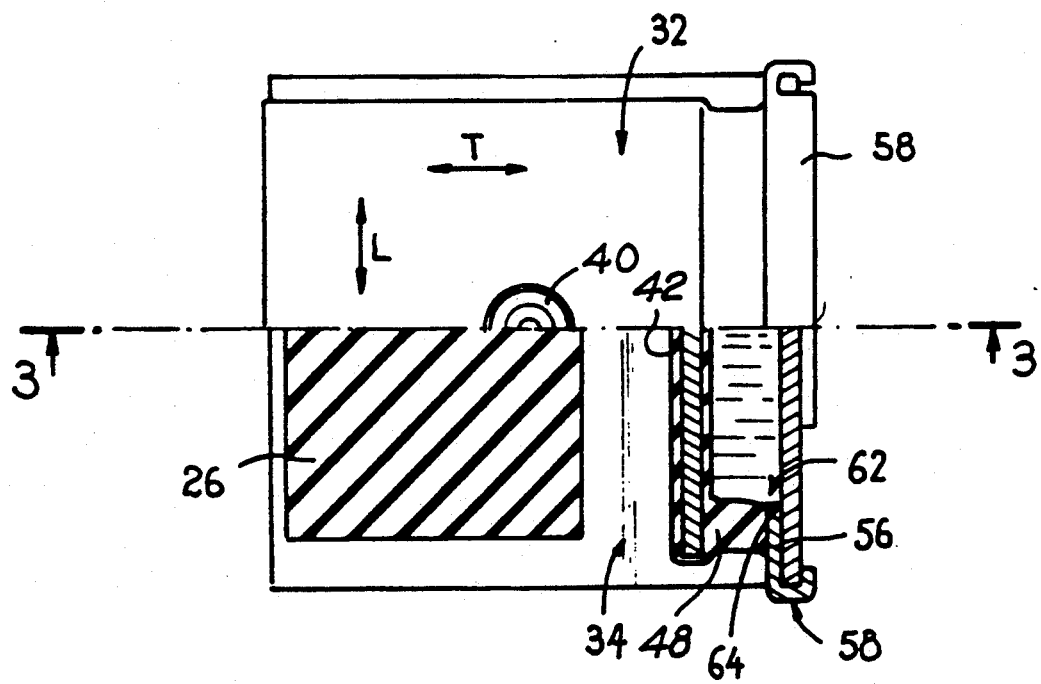
FIG. 4 is a semi-top view and a semi-sectional view taken on line 4—4 of FIG. 3.

There will now be described in detail a first embodiment of an elastically yieldable connection 24 such as illustrated in FIGS. 3 to 5.

In the known manner, the elastically yieldable connection comprises a block of an elastomer material 26 substantially extending in the vertical direction V and whose opposed surfaces 28 and 30 are connected by bonding or vulcanization to two opposed main armatures 32 and 34.

The lower surface 30 of the block 26 is connected to the lower main armature 34 by means of a planar intermediate armature 36 to which it is bonded or vulcanized, the latter being connected to the main armature 34 proper by a reciprocal clamping by means of a mounting screw of the connection 38 whose head is embedded in the block 26 and which extends through the armatures 36 and 34 to permit the mounting of the elastically yieldable connection on a part of the cross-member 20.

The two opposed main armatures 32 and 34 are parallel planar metal armatures extending in planes perpendicular to the vertical direction V.

The connection further comprises a second mounting screw 40 which extends through the upper main armature 32 in the vertical direction away from the screw 38 to permit the fixing of the elastically yieldable connection to the body 18 of the vehicle.

The upper main armature 32 comprises a planar lateral portion 42 bent at 90° and extending in a plane perpendicular to the transverse direction T toward the lower armature 34.

Symmetrically, the lower armature 34 includes a planar lateral portion 44 bent at 90° which extends in a direction parallel to the confronting portion 42 of the latter.

The two armature portions 42 and 44 define therebetween a space in which is arranged in accordance with the invention a deformable sealed chamber 46 filled with liquid.

The chamber 46 is laterally defined by a cylindrical tubular lateral wall 48 whose generatrix is parallel to the transverse direction T. Owing to its thickness "e", the tubular lateral wall 48 has two opposed annular end surfaces 50 and 52 which are each connected in a sealed manner to an armature portion 42 and 44 respectively.

The end surface 50 is completed by a thin end wall 54 which is in one piece with the lateral wall 48 bonded or vulcanized to the confronting surface of the armature portion 42.

The annular end surface 52 is connected by bonding or vulcanization to the confronting surface of an intermediate metal frame 56.

The intermediated metal frame 56 has a contour corresponding to the rectangular contour of the annular end surface 52.

The intermediate frame 56 is provided on three of its sides with a peripheral edge portion 58 which is formed over onto the corresponding rectangular periphery of the armature portion 44.

The fourth side of the intermediate frame 56, i.e. the lower side as viewed in FIGS. 3 and 5, also includes a short peripheral edge portion 59 which extends through an assembly slot 60 of the armature portion 44 and whose free edge portion is formed over onto the confronting surface of the armature portion 44.

As can be seen in particular in FIGS. 3 and 4, the tubular lateral wall 48 includes an inner sealing bead 62 which is in one piece with the lateral wall 48 in the vicinity of its annular end surface 52, which cooperates with the inner edge portion 64 of the intermediate frame 56 and the confronting surface of the armature portion 44 to ensure a sealed connection between the frame 56 and the armature portion 44.

According to the invention, there is consequently defined a deformable sealed chamber 46 which, when the elastically yieldable connection is realized, must be completely filled with a liquid.

As can be seen in FIG. 3, the aperture 65 provided in the lower main armature 34 for allowing the passage of the mounting screw 38 is an oblong aperture which permits the mounting of the lower armature 34 on the peripheral edge portion 59 of the frame 56, by inclination and then tilting before the setting or forming over operation.

According to the invention, the lateral wall 48 has, as can be seen in FIGS. 3 and 4, an arch-shaped profile whose convexity faces toward the interior of the chamber 46. This feature, combined with a great thickness "e", ensures a maximum resistance to the increase in the pressure inside the chamber 46 when the latter is compressed between the two armature portions 42 and 44 when the two main armatures 32 and 34 are displaced relative to each other in a direction parallel to the transverse direction T in the direction corresponding to their moving toward each other, i.e. when the main armature 32 moves in the direction T1 and/or the lower main armature 34 moves in the direction T2.

In order to effect a complete filling of the chamber 46, the operation for assembling the elastically yieldable connection, i.e. the operation for forming over the edge portion of the frame 56, is preferably carried out by immersion in a bath of a liquid provided for filling the chamber 46, which may be in particular water to which an anti-freeze product is added.

The block 26 of elastomer material and the lateral wall 48 may be formed by moulding on the main upper armature 32 in a single operation.

The connection just described has a transverse elastic stiffness which is substantially equal to twenty times the elastic stiffness of the connection in the vertical direction V, i.e. which is due solely to the presence of the block of elastomer material 26.

Indeed, it will be easily understood that, in the case where the two main armatures 32 and 34 are stressed, either in the vertical direction V or in the longitudinal direction L, the chamber 46 and the lateral wall 48 (the latter operating under shear stress) have no amplifying effect on the elastic stiffness of the connection in these two directions.

The embodiment of the elastically yieldable connection shown in FIG. 6 will now be described. Elements identical or similar to those of the connection of FIGS. 3 to 5 are designated by the same reference numerals increased by a 100.

Figure 6:
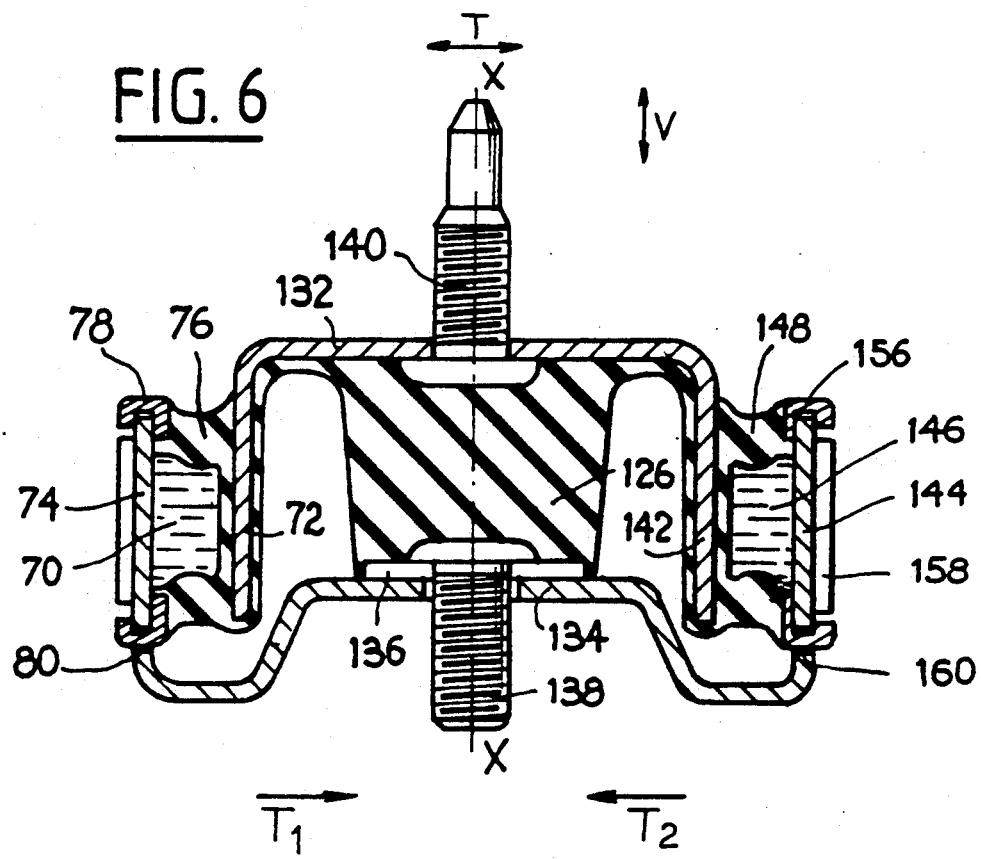
FIG. 6 is a sectional view similar to FIG. 3 of a second embodiment of an elastically yieldable connection.

The elastically yieldable connection of FIG. 6 comprises two chambers 146 and 70 arranged symmetrically on each side of the general axis X—X of the elastically yieldable connection common to the two fixing screws 138 and 140.

For this purpose, the second sealed chamber 70 whose structure is in every way identical to that of the first chamber 146, extends between a second armature portion 72 of the upper main armature 132 and a second armature portion 74 of the lower main armature 134.

The second armature portions 72 and 74 are symmetrical relative to the armature portions 142 and 144 and extend in planes parallel to the latter and in opposed relation relative to the axis X—X.

The lateral wall 76 of the second chamber 70 is also connected to the armature portion 74 by means of an intermediate frame 78.

The two extensions 142 and 72 of the main armature 132 extend in parallel relation downwardly between the two extensions 144 and 74 of the lower main armature 134.

To assemble the elastically yieldable connection of FIG. 6, the two intermediate frames 156 and 78 must be slightly compressed respectively in directions T2 and T1 to permit their introduction between the two outer armature portions 144 and 74 until the lower edge portions of the frames 156 and 78 enter the slots 160 and 80. It is then merely necessary to effect a forming over operation on the two frames.

Owing to its symmetrical design with respect to the axis X—X, the elastically yieldable connection of FIG. 6 has an equal elastic stiffness in the direction T irrespective of the direction of relative displacement of the two main armatures 132 and 134.

The mounting of a set of wheels of a vehicle by means of two elastically yieldable connections of the type of those shown in FIG. 6 enables the guiding of the set of wheels to be still further increased.

The second embodiment of the elastically yieldable connection according to the invention shown in FIG. 7 will now be described. Elements identical or similar to those of FIG. 1 are designated by the same reference numerals increased by 200.

Figure 7:
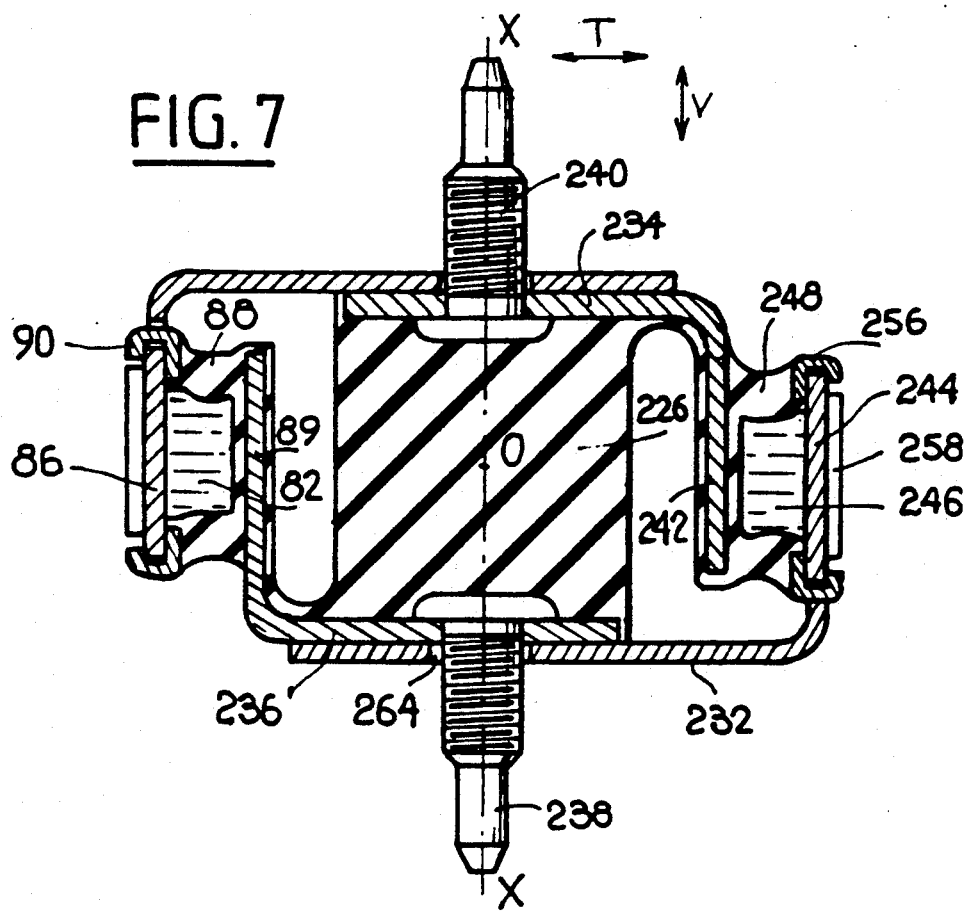
FIG. 7 is a view similar to FIG. 6 of a third embodiment of an elastically yieldable connection according to the teaching of the invention.

The elastically yieldable connection shown in FIG. 7 comprises a symmetrical structure relative to the centre O of the block of elastomer 226 located on the axis X—X common to the mounting screws 238 and 240.

The main upper armature 234 is completed by a second main upper armature 84 which is extended by an armature portion 86 bent at 90°.

In the same way, the intermediate armature 236 is extended by an armature portion 89 bent at 90° and parallel to the armature portion 86, these two last-mentioned portions being also parallel to the armature portions 242 and 244. The lateral wall 88 defining the second chamber 82 is connected in a sealed manner to the extension of the armature 86 by an intermediate frame 90.

The elastically yieldable connection is assembled by slightly compressing the two frames 256 and 90 in the direction toward the axis X—X so that they come to be inserted between the confronting armature portions 244 and 86.

The two sealed chambers 246 and 82 are disposed between the two pairs of alternating extensions 244, 242, 89 and 86 (from the right toward the left, as viewed in FIG. 7) so as to obtain a maximum elastic stiffness of the elastically yieldable connection in the direction T.

As can be seen in FIGS. 6 and 7, the lateral walls of the sealed chambers may be in one piece with the central block of elastomer material and made in a single moulding operation.

In the case of FIG. 7, the complementary upper main armature 84 and the lower main armature 232 are respectively connected with the upper main armature 234 and with the intermediate armature 236 when mounting the connection on the vehicle and by tightening the screws 238 and 240.

We claim:

1. An elastically yieldable connection comprising:
a block of elastomer material,
two relatively movable armatures connected to said block, first portions of said armatures being generally planar and being generally parallel to one another,
means for increasing elastic stiffness of the connection in a direction of displacement substantially perpendicular to the generally planar armature portions including means defining at least one deformable sealed chamber having a substantially constant volume, free of internal fluid flow restrictions, filled with a liquid, and arranged between said generally planar armature portions and having dimensions less than the planar extent of the generally planar armature portions, whereby elastic stiffness of the connection is increased in a direction of relative displacement of said armatures substantially perpendicular to said generally planar armature portions,
wherein said armatures include opposed and parallel second portions,
wherein the block of elastomer material axially separates said second armature portions, said separating block having opposed surfaces bonded or vulcanized to the opposed armature portions, each of said generally planar first armature portions being bent at about 90° toward the opposed second armature portions, and
wherein the sealed chamber is deformable in response to displacement components in the plane of the generally planar first armature portions.

2. An elastically yieldable connection according to claim 1, wherein a tubular lateral wall composed of an elastomer material defines said at least one deformable sealed chamber and has opposed annular end surfaces each being connected in a sealed manner to a confronting surface of said generally planar first armature portions.

3. An elastically yieldable connection according to claim 2, wherein the tubular lateral wall is a substantially cylindrical wall having a generatrix parallel to the direction of displacement.

4. An elastically yieldable connection according to claim 3, wherein the tubular lateral wall has a director curve which is a rectangle.

5. An elastically yieldable connection according to claim 2, wherein said tubular lateral wall includes an end wall bonded or vulcanized to a confronting surface of one of said generally planar first armature portions and cooperates to define said deformable sealed chamber.

6. An elastically yieldable connection according to claim 2, further comprising an intermediate connecting frame bonded or vulcanized to one of said annular end surfaces and having a contour which substantially corresponds to the contour of said annular end surface and includes sealed connection means for connection with the confronting generally planar first armature portion.

7. An elastically yieldable connection according to claim 6, wherein said sealed connection means comprises a peripheral edge portion of said intermediate connecting frame formed around said first armature portion.

8. An elastically yieldable connection according to claim 7, wherein said sealed connection means further comprises an inner sealing bead integral with said tubular lateral wall in the vicinity of said annular end surface which bead cooperates with an inner edge portion of said intermediate connecting frame and the confronting surface of said generally planar first armature portion.

9. An elastically yieldable connection according to claim 2, wherein said tubular lateral wall has, in cross section in a plane parallel to said direction of displacement, an arch-shaped profile having a convexity facing toward the interior of said chamber.

10. An elastically yieldable connection according to claim 1, further comprising two other generally planar parallel armature portions which are generally parallel and which are generally perpendicular to said direction of relative displacement, and a second deformable sealed chamber filled with a liquid is arranged between said two other generally planar armature portions.

11. An elastically yieldable connection according to claim 10, wherein the two generally planar portions of one of said two armatures extend between the two generally planar portions of the other of said two armatures so as to increase the axial stiffness of the connection in said direction of relative displacement in both directions of displacement.

12. An elastically yieldable connection according to claim 10, wherein the two generally planar portions of one of said two armatures are arranged in an alternating manner relative to the two generally planar portions of the other of said two armatures so as to increase the axial stiffness of the connection in said direction of relative displacement in one direction of displacement.

13. An elastically yieldable connection according to claim 1 wherein the means for increasing elastic stiffness provides a stiffness in the direction of displacement which is at least 20 times the stiffness perpendicular to the direction of displacement.

14. An elastically yieldable connection according to claim 1 wherein the liquid is water with an antifreeze additive.

* * * * *